United States Patent
Thörn et al.

(10) Patent No.: US 11,434,004 B2
(45) Date of Patent: Sep. 6, 2022

(54) CONTROLLING A GROUP OF DRONES FOR IMAGE CAPTURE

(71) Applicant: SONY GROUP CORPORATION, Tokyo (JP)

(72) Inventors: Ola Thörn, Limhamn (SE); Peter Exner, Malmö (SE)

(73) Assignee: SONY GROUP CORPORATION, Tokyo (JP)

(*) Notice: Subject to any disclaimer, the term of this patent is extended or adjusted under 35 U.S.C. 154(b) by 287 days.

(21) Appl. No.: 16/861,919

(22) Filed: Apr. 29, 2020

(65) Prior Publication Data
US 2020/0369385 A1  Nov. 26, 2020

(30) Foreign Application Priority Data

May 20, 2019  (SE) .................... 1950599-9

(51) Int. Cl.
*B64C 39/02* (2006.01)
*B64D 47/08* (2006.01)

(52) U.S. Cl.
CPC .......... *B64C 39/024* (2013.01); *B64D 47/08* (2013.01); *B64C 2201/027* (2013.01);
(Continued)

(58) Field of Classification Search
CPC .......... B64C 39/024; B64C 2201/027; B64C 2201/123; B64C 2201/127; B64C 2201/143; B64D 47/08
See application file for complete search history.

(56) References Cited

U.S. PATENT DOCUMENTS 9,639,960 B1 * 5/2017 Loveland ............ G05D 1/0044
2010/0305724 A1 * 12/2010 Fry .......................... G09B 9/44
700/92

(Continued)

FOREIGN PATENT DOCUMENTS

DE     202014104937 U1 * 12/2014 ............ G01C 21/04
DE     102014115046 A1 *  4/2016 ............ G01C 11/04
(Continued)

OTHER PUBLICATIONS

Nageli et al, "Real-time Planning for Automated Multi-View Drone Cinematography", Jul. 2017, ACM Transcations on Graphics, vol. 36 No. 4, whole document (Year: 2017).*
(Continued)

*Primary Examiner* — Peter D Nolan
*Assistant Examiner* — Kenneth M Dunne
(74) *Attorney, Agent, or Firm* — Myers Bigel, P.A.

(57) ABSTRACT

Drones are controlled by one or more control devices and comprise a respective camera for image capture. The one or more control devices perform a method including obtaining projected flight paths of the drones, obtaining a projected camera setting of the respective camera, computing, as a function of the projected camera setting, a projected viewing frustum of the respective camera, defining, for the drones, projected time-space trajectories of no-fly zones based on the projected viewing frustum of the respective camera, analyzing the projected flight paths of the drones in relation to the projected time-space trajectories for detection of a violation of one or more of the no-fly zones, and setting an operative flight path and/or an operative camera setting for at least one selected drone to prevent the violation.

19 Claims, 5 Drawing Sheets

(52) U.S. Cl.
CPC .. *B64C 2201/123* (2013.01); *B64C 2201/127* (2013.01); *B64C 2201/143* (2013.01)

(56) References Cited

U.S. PATENT DOCUMENTS

| | | | |
|---|---|---|---|
| 2015/0301529 A1* | 10/2015 | Pillai | G08G 5/0026 |
| | | | 701/2 |
| 2016/0139596 A1* | 5/2016 | Na | G08C 17/02 |
| | | | 701/2 |
| 2017/0178515 A1* | 6/2017 | Brune | G06V 20/13 |
| 2017/0313416 A1* | 11/2017 | Mishra | H04N 7/181 |
| 2018/0046187 A1* | 2/2018 | Martirosyan | B64D 47/08 |
| 2018/0143636 A1* | 5/2018 | Pinto | G05D 1/12 |
| 2018/0213146 A1* | 7/2018 | Chen | G03B 15/006 |
| 2018/0213208 A1 | 7/2018 | Guo et al. | |
| 2018/0247421 A1* | 8/2018 | DeAngelis | G01S 1/0428 |
| 2019/0049945 A1* | 2/2019 | Moeller | H04N 5/225 |
| 2019/0051193 A1* | 2/2019 | Gutierrez | G05D 1/104 |
| 2019/0051194 A1* | 2/2019 | Campos Macias | |
| | | | G06K 7/10722 |
| 2019/0102949 A1* | 4/2019 | Sheftel | G06T 15/20 |
| 2019/0104250 A1 | 4/2019 | Sheftel et al. | |
| 2019/0118945 A1 | 4/2019 | Loveland et al. | |
| 2019/0196513 A1* | 6/2019 | Zhou | G05D 1/0094 |
| 2019/0369613 A1* | 12/2019 | Moon | B64C 39/024 |
| 2020/0201331 A1* | 6/2020 | Hortner | G05D 1/0094 |
| 2020/0368616 A1* | 11/2020 | Delamont | A63F 13/213 |
| 2021/0258470 A1* | 8/2021 | Kudo | G03B 15/00 |

FOREIGN PATENT DOCUMENTS

| | | | | |
|---|---|---|---|---|
| KR | 10-2018-0120289 A | 11/2018 | | |
| WO | WO-2016154936 A1 * | 10/2016 | | B64C 39/024 |
| WO | 2017/030737 A1 | 2/2017 | | |

OTHER PUBLICATIONS

Hoenig et al, "Trajectory Planning for Qaudrotor Swarms", Aug. 2018, IEEE, pp. 4-6 (Year: 2018).*
Swedish Office Action and Search Report, SE Application No. 1950599-9, dated Dec. 4, 2019, 8 pp.
"Communication with European Search Report", EP Application No. 20164369.9, dated Oct. 2, 2020, 6 pp.
Galvane, Quentin , et al., "Directing Cinematographic Drones", ACM Transactions on Graphics, vol. 37, No. 3, Jul. 27, 2018, 34:1-34:18.
Nägeli, Tobias , et al., "Real-time planning for automated multi-view drone cinematography", ACM Transactions on Graphics, vol. 36, No. 4, Jul. 20, 2017, 132/1-132/10.

* cited by examiner

CONTROLLING A GROUP OF DRONES FOR IMAGE CAPTURE

RELATED APPLICATION

The present application claims the benefit of and priority to Swedish Patent Application No. 1950599-9, filed May 20, 2019, the disclosure of which is incorporated herein by reference in its entirety.

TECHNICAL FIELD

The present disclosure relates generally to image capture by use of drones, and, more particularly, to controlling a group of drones for image capture.

BACKGROUND

Drones, also known as unmanned aerial vehicles (UAVs), are finding increasing use in audio-visual applications. Small drones equipped with high-quality cameras are commercially available and capable of producing unique video streams thanks to their maneuverability and their advantageous viewing points when flying.

There are situations that may benefit from using plural drones to jointly capture footage of a scene, for example in professional or amateur filming of events such as concerts and sport activities. The use of plural drones enables the scene to be simultaneously captured from different angles and at different levels of detail. The resulting footage may be streamed in real time for viewing or recorded for subsequent editing. Plural drones may also be used for recording of cinematographic footage and for search and rescue (SAR) applications.

The use of plural drones requires careful planning, both with respect to the flight path and the camera setting for each drone. Each drone is then manually controlled by a respective operator. Should an operator deviate from the pre-planned flight path and camera setting, the camera on the operator-controlled drone may miss relevant parts of the scene and/or unintentionally include other drones in the footage. It is thus desirable to alleviate the reliance on human operators.

One conceivable alternative would be to implement an automatic control system that controls the drones in accordance with pre-planned flight paths and camera settings. However, such automatic control may be difficult to combine with dynamic scenes, for example scenes with moving targets. While it is possible to arrange one or more drones to autonomously track a moving target while filming it, and while drones may be equipped with collision avoidance systems ensuring safe flight paths, the flight paths cannot be pre-planned and it is difficult to ensure that one drone does not interfere with the footage of another drone.

Corresponding problems may occur for drones with vision-based guidance systems. Such a guidance system is capable of determining, based on footage captured by the drone, waypoints of the flight path or a landing area and give feedback to an onboard control system for autonomous navigation and landing. When multiple drones with vision-based guidance systems inhabit a common airspace, for example in parcel delivery in a densely populated neighborhood, one drone may interfere with the footage of another drone, potentially causing the latter to lose track of its flight path or landing area.

SUMMARY

It is an objective to at least partly overcome one or more limitations of the prior art.

A further objective is to facilitate operation of plural drones for image capture.

A yet further objective is to relax the requirement for path planning while ensuring quality and relevance of the images captured by the drones.

One or more of these objectives, as well as further objectives that may appear from the description below, are at least partly achieved by a method of controlling a group of cooperating drones, a control system, a control device, and a drone according to the independent claims, embodiments thereof being defined by the dependent claims.

Still other objectives, as well as features, aspects and technical effects will appear from the following detailed description, the attached claims and the drawings.

BRIEF DESCRIPTION OF DRAWINGS

Embodiments will now be described in more detail with reference to the accompanying schematic drawings.

DETAILED DESCRIPTION OF EXAMPLE EMBODIMENTS

Figure 1A:
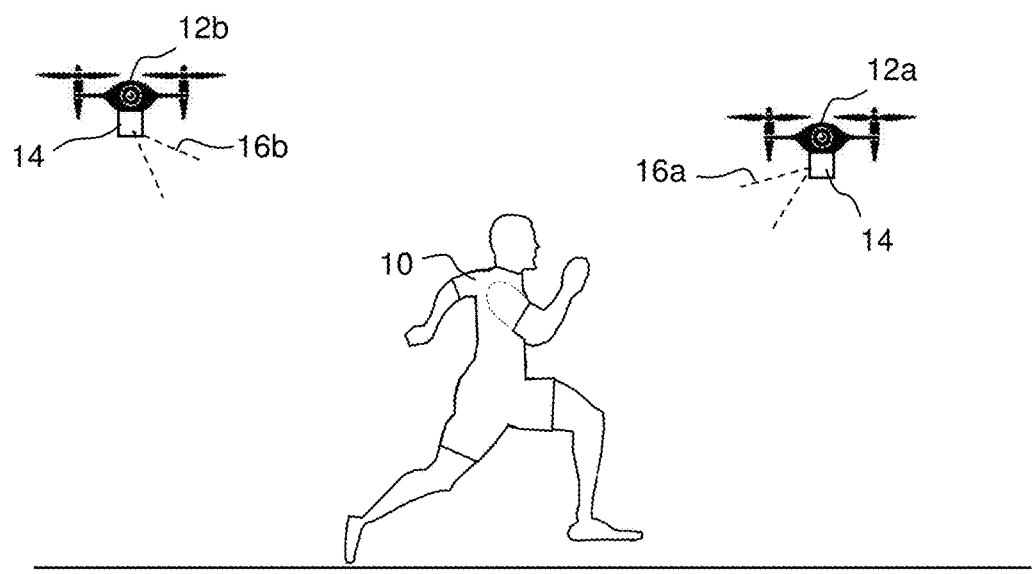
FIG. 1A shows two cooperating drones that film an individual.

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments. The term "compute", and derivatives thereof, is used in its conventional meaning and may be seen to involve performing a calculation involving one or more mathematical operations to produce a result, for example by use of a computer.

As used herein, a "group of drones" is intended to imply a provision of two or more drones. Likewise, the terms "multiple", "plural" and "plurality" are intended to imply provision of two or more drones.

As used herein, a "set" of items is intended to imply a provision of one or more items.

As used herein, a "time-space trajectory" of a zone designates both movement and spatial change of the zone as a function of time. Thus, the time-space trajectory designates both the trajectory (movement) of the zone as a function of time, in a reference coordinate system, and the potential change of the spatial extent of the zone along the trajectory.

As used herein, the attribute "projected" implies an event that is planned or estimated at one or more future time points. Thus, a projected flight path refers to a future flight path that may be known from a predefined flight plan or estimated based on previous movement and/or other input data, for example the above-mentioned vision-based guidance system. Similarly, a projected camera setting refers to a setting of a camera at one of more future time points.

As used herein, "viewing frustum" (also known as "view frustum") is used in its ordinary meaning and refers to the field of view of a camera system with near and far bounds given by the depth of field of the camera system. Thus, the viewing frustum is a representation of the actual cone of vision of the camera system. The shape of the viewing frustum depends on the camera system, for example the lens system and the sensor, and the required degree of accuracy, but is commonly represented as a frustum of a rectangular pyramid. Within the context of the present disclosure, the viewing frustum may have any shape.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure. As used herein, the term "and/or" includes any and all combinations of one or more of the associated listed items.

Embodiments are related to controlling of drones that are equipped for image capture and operated in a group. Drones, also known as unmanned aerial vehicles (UAVs), are aircrafts controlled by an onboard automated control system, a ground-based control system or by a ground-based human pilot. The respective drone may move along a pre-programmed flight path, a flight path chosen in real-time by the ground-based human pilot, a flight path determined by a tracking mechanism that controls the drone in real-time to follow an object, or any other dynamically determined flight path. The flight path may also be adjusted by a built-in collision avoidance system, which is well-known in the art.

FIG. 1A shows two drones 12a, 12b that form part of a group. Each drone 12a, 12b has at least one onboard camera system 14 ("camera") which may be fixed or moveable in relation to the drone 12a, 12b. For example, the onboard camera 14 may be attached to the drone 12a, 12b by one or more gimbals (not shown) that allow the camera 14 to rotate or move relative to the drone 12a, 12b, as is known in the art. The camera 14 on the respective drone 12a, 12b defines a respective field of view 16a, 16b. In the example of FIG. 1A, the drones 12a, 12b are operated to capture footage of an individual 10 performing an activity and the drones 12a, 12b are operated to capture footage of the individual 10 from different angles.

Figure 1B:
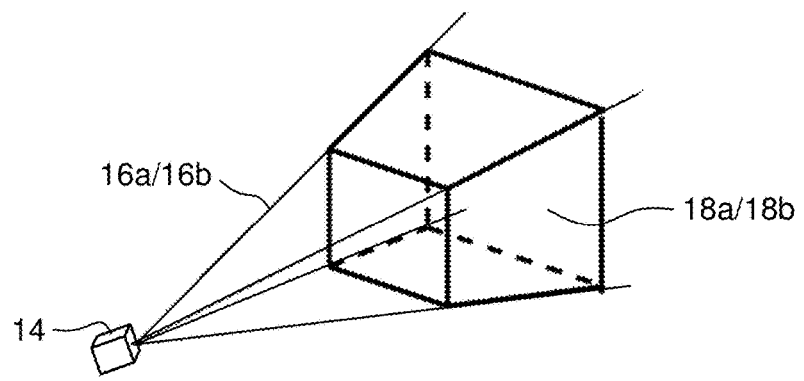
FIG. 1B exemplifies a viewing frustum of a camera on the respective drone.

FIG. 1B shows an example of a viewing frustum 18a, 18b for the camera 14 on the respective drone 12a, 12b. The illustrated viewing frustum 18a, 18b has the shape of a truncated pyramid, in which the lateral sides of the pyramid are set to match the field of view 16a, 16b of the camera 14, and near and far planes are set to match the extent and location of the depth of field of the camera 14. The viewing frustum 18a, 18b spans a three-dimensional (3D) volume which is reproduced into two-dimensional (2D) images by the camera 14.

Figure 2A:
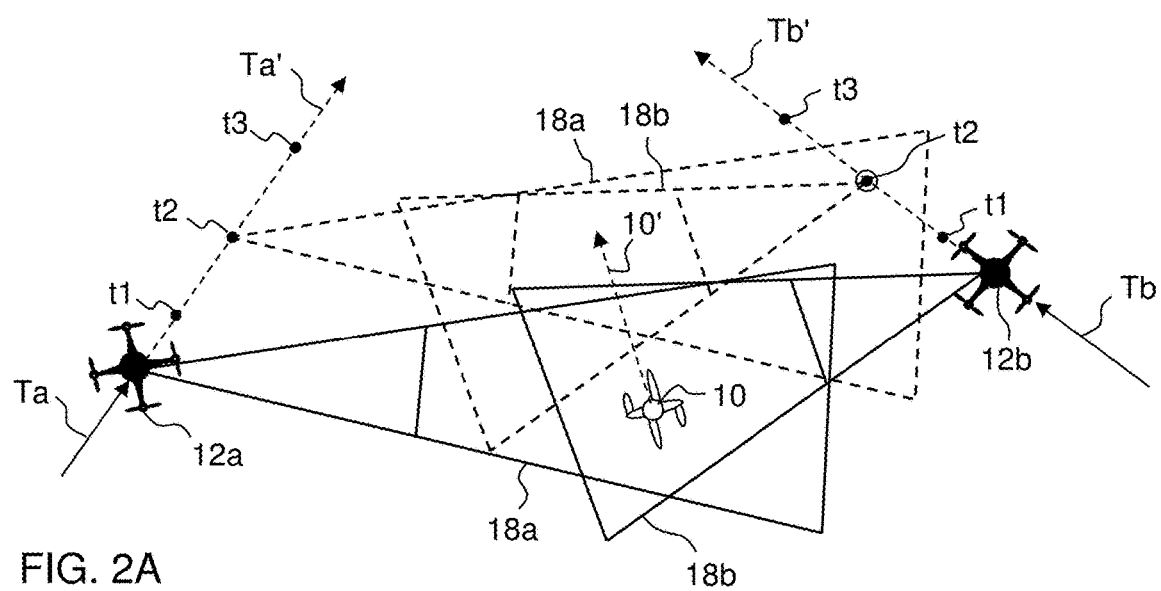
FIGS. 2A-2C are top plan views of drone positions and camera-associated no-fly zones as a function of time.
Figure 2B:
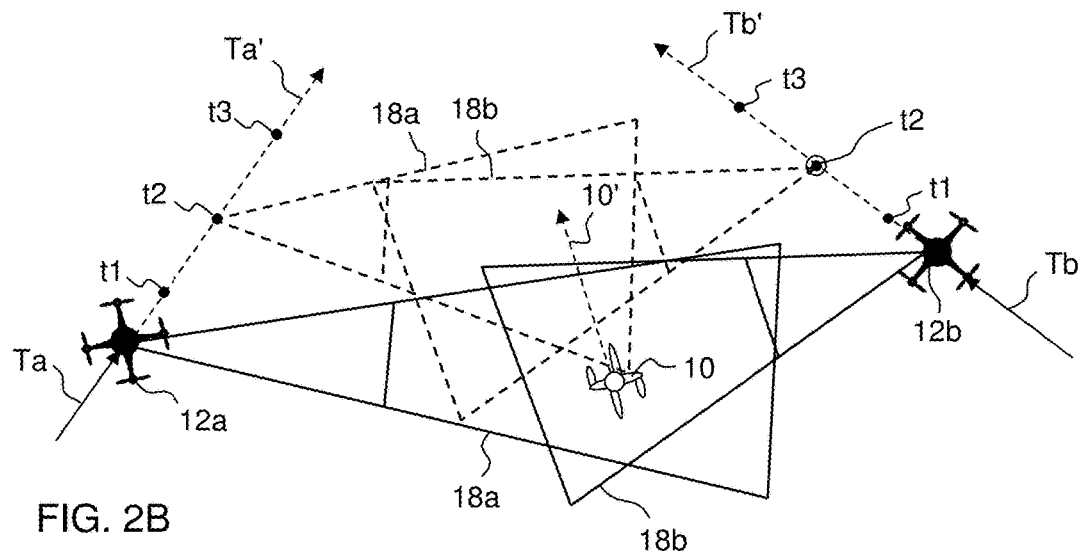
Figure 2C:
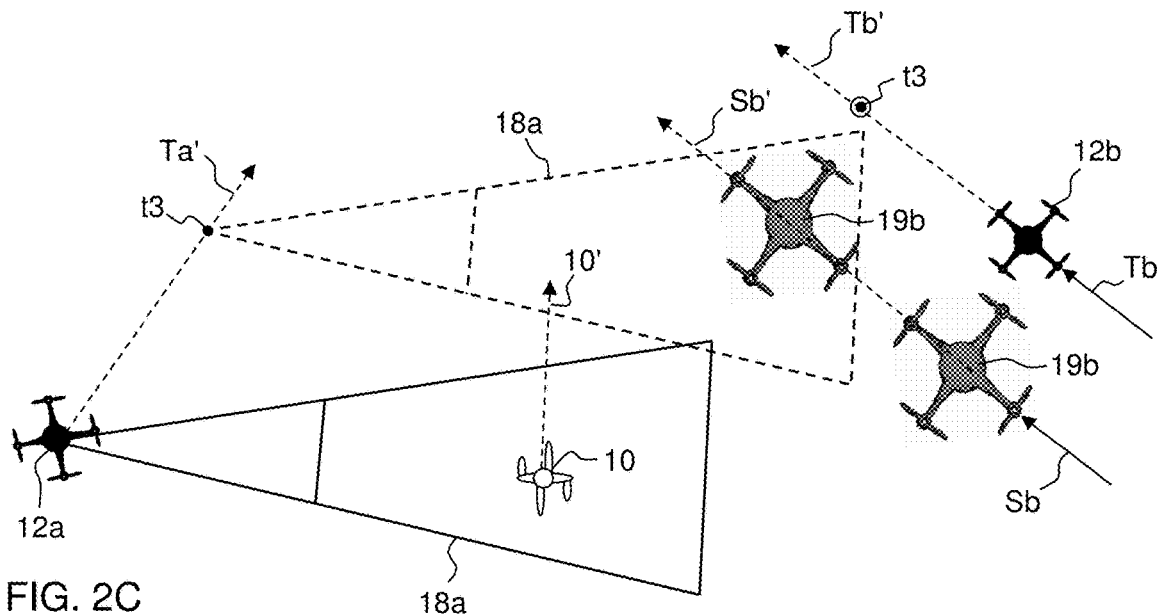

FIGS. 2A and 2C may serve to illustrate problems of drone-in-image interference that may occur during operation of a group of drones.

FIG. 2A is a top plan view of the drones 12a, 12b of FIG. 1A when operated in relation to the individual 10. The drones 12a, 12b have moved along a respective flight path or trajectory Ta, Tb, indicated by a respective solid arrow. The flight paths Ta, Tb are actual or "operative" flight paths that represent the actual movement of the drones 12a, 12b. FIG. 2A is a snap-shot taken at a specific time point, and the location of the respective drone 12a, 12b at future time points t1, t2 and t3 are represented by dots along a respective projected flight path or trajectory Ta', Tb' (dashed arrows). As noted above, the respective projected flight path Ta', Tb' may be predefined, determined by a human pilot or determined dynamically, for example by a tracking mechanism that controls the drone to follow the individual 10. FIG. 2A also indicates the location and extent of the viewing frustum 18a, 18b of the camera 14 of the respective drone 12a, 12b at the current time (solid lines) and at time point t2 (dashed lines). In the illustrated example, drone 12b will be located inside the viewing frustum 18a of drone 12a at time point t2.

FIG. 2C is a top plan view similar to FIG. 2A, in which the shadow 19b of drone 12b is shown. As the drone 12b moves along the flight path Ta, the shadow 19b moves along flight path Sb with a displacement that depends on the location of a light source, which may be the sun if outdoors, or electric lighting if indoors. Although the flight paths Tb, Sb are shown as parallel in FIG. 2B, it should be understood that flight path Sb may temporarily deviate from flight path Tb depending on the terrain. For example, the shadow 19b may be temporarily shifted laterally with respect to the indicated flight path Sb if the ground is inclined and/or non-flat. In the illustrated example, projected flight paths Tb', Sb' of drone 12b and its shadow 19b indicate that the shadow 19b of drone 12b will be located inside the viewing frustum 18a of drone 12a at time point t3.

Embodiments, as exemplified in the following, aim to mitigate the risk that one or more drones in a group of drones inadvertently show up, directly or as a shadow, in an image captured by another drone in the group.

Figure 3:
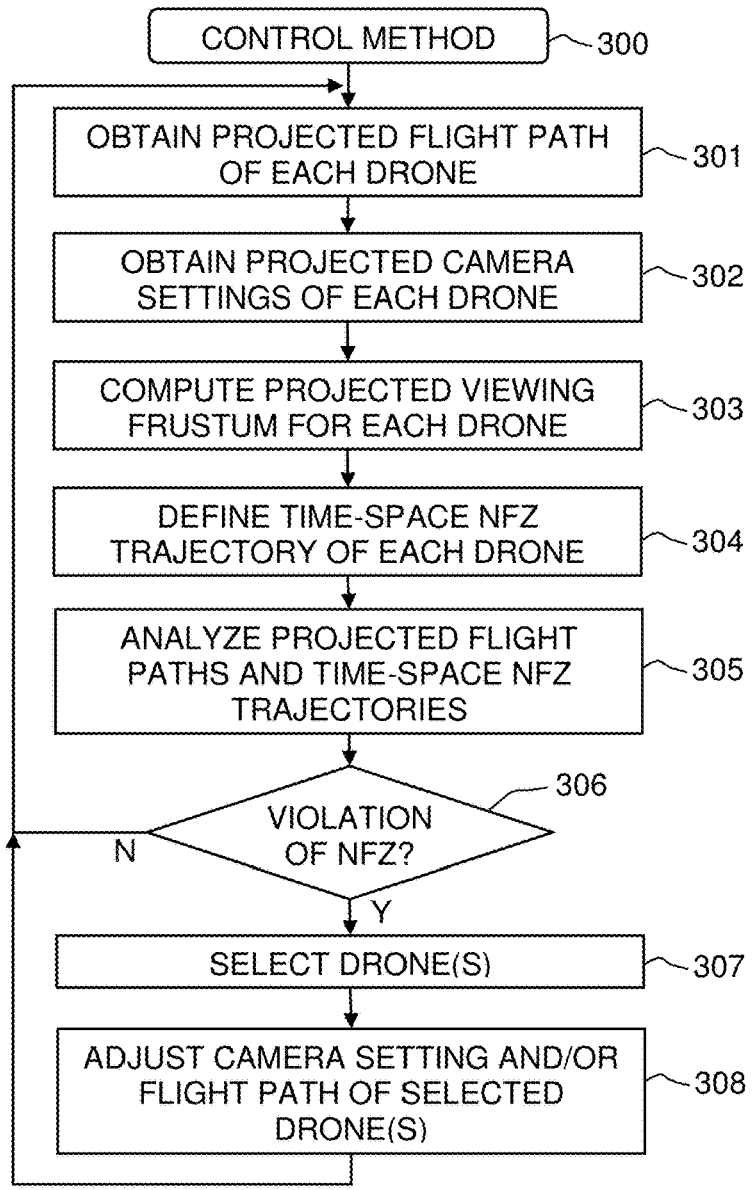
FIG. 3 is a flow chart of a drone control method in accordance with an embodiment.

FIG. 3 is a flow chart of a control method 300 in accordance with an embodiment. The method 300 controls a group of drones and is performed repeatedly at consecutive time points while the drones are flying. Each such consecutive time point may be regarded as a current time point.

Step 301 obtains a projected flight path of the respective drone in the group (cf. Ta', Tb' in FIG. 2A). In a first example, the projected flight path may be given by a predefined flight plan that defines a trajectory for the respective drone. In a second example, the projected flight path may be estimated based on the current position of the drone in relation to a target location, for example a landing site or a waypoint. In a third example, the projected flight path may be estimated based on current and preceding positions of the drone, speed data, acceleration data, etc.

Step 302 obtains a projected camera setting of the camera on the respective drone. The camera setting may include values of camera parameters that affect the location and extent of the viewing frustum in relation to the drone, for example zoom level, aperture setting ("f-number"), focal length, and camera orientation in relation to the drone ("camera angle"). The camera setting may also include values of other camera parameters, such as exposure time and ISO sensitivity of the camera sensor. In one example, the projected camera setting may be given by the above-mentioned flight plan and may thus be predefined. In another example, the camera setting may be fixed over time. In another example, for example if the camera is configured to auto-adjust camera parameters such as focal depth, f-number, etc., the projected camera setting may be estimated based on a projected movement of the object (cf. dashed arrow 10' in FIGS. 2A-2C), optionally in combination with knowledge of the terrain.

Step 303 computes a projected viewing frustum of the camera on the respective drone, based on the projected camera setting. Step 303 may apply a predefined algorithm that outputs defining parameter values for a viewing frustum as a function of camera parameter values.

Step 304 associates a no-fly zone (NFZ) with the respective drone. Specifically, step 304 sets the NFZ based on the projected viewing frustum. Depending on implementation, step 304 may set the NFZ equal to the viewing frustum or larger or smaller than the viewing frustum with a certain margin. Ultimately, step 304 defines a projected time-space NFZ trajectory for the respective drone, by combining the projected flight path of the drone with the projected viewing frustum of the camera on the drone. The projected time-space NFZ trajectory thereby defines the spatial extent and location of the NFZ at one or more future time points. Reverting to FIG. 2A, the projected time-space NFZ trajectories of drones 12a, 12b correspond to the location and extent of the viewing frustum 18a, 18b, respectively, from the current time point to one or more of time points t1, t2 and t3.

Step 305 analyzes the projected flight paths of the drones in relation to the projected NFZ time-space trajectories for detection of a future or projected violation of one or more NFZs. In one embodiment, the projected violation is detected when at least one drone is at least partly located within an NFZ at a future time point. Step 305 may involve mapping projected locations and known extents of the drones along the projected flight paths at one or more time points to the location and extent of the NFZs at the corresponding time point(s). Reverting to FIG. 2A, step 305 will infer that a violation between drones 12a, 12b may occur at future time point t2, and step 305 thus detects a projected violation at future time point t2.

If no projected violation of the NFZs is detected by step 305, step 306 returns to step 301. If a projected violation of one or more NFZs is detected by step 305, step 306 proceeds to step 307.

Steps 307-308 operate to resolve or counteract the projected violation detected by step 305. Step 307 selects one or more of the drones involved in the projected violation, i.e. among drone(s) projected to move into an NFZ and drone(s) associated with an NFZ that is projected to encompass at least part of a drone. Step 308 adjusts the camera setting and/or the flight path of the selected drone(s) to prevent the projected violation and then returns to step 301. By adjusting the flight path, the future location of the selected drone is changed. The selected drone to adjust its flightpath is thus a drone that would, absent the adjustment, enter the NFZ of another drone. By adjusting the camera setting, the future location and/or extent of the viewing frustum and thus the NFZ of the selected drone is changed. The selected drone to adjust its camera setting is thus the drone that is associated with the NFZ to be violated by another drone. It should be noted that step 308 adjusts the operative control of the selected drone, i.e. the operative camera setting and/or operative flight path that will be applied somewhere between the current time point and the future time point when an NFZ violation is expected according to step 305. Step 308 may thus be seen to set or define an operative flight path and/or an operative camera setting for controlling the selected drone(s) so as to prevent the projected violation of the NFZ.

FIG. 2B exemplifies how the control method 300 may resolve the projected NFZ violation detected by step 305 in the example of FIG. 2A. Here, the camera setting on drone 12a is modified to reduce the extent of the viewing frustum 18a at time point t2. Alternatively or additionally, step 305 could have changed the flight path of drone 12a and/or the flight path of drone 12b to prevent the NFZ violation that is expected to occur at time point t2.

If the camera 14 is configured to perform an auto-adjustment of its focal length, f-number, zoom, etc., step 307-308 may comprise setting limits for the auto-adjustment, optionally in combination with changing one or more flight paths and/or one or more camera parameters that are not subject to auto-adjustment, to prevent the projected NFZ violation detected by step 305.

The control method 300 has the advantage of effectively mitigating the risk that a drone appears in the images captured by the group of drones. The control method 300 may be particularly advantageous in situations when one or more of the drones in the group are configured to autonomously track an object, for example by adjusting the flight path and optionally the camera setting to maintain the object within the viewing frustum. In the absence of the control method 300, it is not unlikely that the drones in the group happen to film each other. For similar reasons, the control method 300 may be advantageous when one or more of the drones in the group are controlled by a ground-based human pilot. The control method may also be advantageous in situation when all drones have predefined flight paths, since it will relax the requirements on the planning of the flight paths. The control method 300 may operate, by steps 307-308, to temporarily cause a drone to deviate from its predefined flight path to prevent a projected NFZ violation and then direct the drone back onto the predefined flight path.

Step 307 may utilize a predefined prioritization logic to select the drone(s) to be adjusted. In one embodiment, each drone is associated with a respective priority value or status value, and the prioritization logic determines the selected drone(s) as a function of the priority value. The priority value may be predefined or determined dynamically. In one embodiment, the drones are arranged in a predefined hierarchy by the priority values, and step 307 gives preference to lower-hierarchy drones over higher-hierarchy drones so that the former are primarily selected for adjustment. In another embodiment, step 307 may determine the priority value of each drone as a function of its current position and/or its current camera setting. For example, step 307 may seek to refrain from adjusting drones located within a predefined range of distances and/or angles with respect to the object or to a reference in the terrain. In yet another embodiment, the priority value for a drone is determined as a function of a quality measure of images captured by its onboard camera. The quality measure may comprise one or more of signal-to noise, image contrast, image sharpness, relative object size in image, image distortion, dynamic range, tone reproduction, color accuracy, lens flare, or any other conceivable measure of image quality. Any combination of the foregoing embodiments is also conceivable for determining the priority values.

In one embodiment, the method 300 is also arranged to account for shadows cast by the drones, a problem discussed above with reference to FIG. 2C. In such an embodiment, step 305 may detect a projected NFZ violation when the shadow of at least one drone is at least partly located within an NFZ. In one embodiment, step 305 comprises projecting shadows of the drones onto a three-dimensional (3D) terrain representation ("3D terrain map") and detecting a projected NFZ violation when a shadow of at least one of the drones is at least partly located within at least one NFZ. As understood from FIG. 2C, step 305 may comprise computing, as a function of the projected flight paths Ta', Tb' of the drones 12a, 12b, projected flight paths of the shadows of the drones 12a, 12b, and analyzing the projected flight paths of the shadows, exemplified by projected flight path Sb' for shadow 19b in FIG. 2C, in relation to the projected time-space NFZ trajectories for detection of a projected NFZ violation. In the situation of FIG. 2C, step 305 would detect that a violation may occur at time point t3, at which the shadow 19b of drone 12b is estimated to be located within the viewing frustum of drone 12a. The projected violation may be obviated by steps 307-308 in the same way as described above.

The above-mentioned 3D terrain map may be given at any level of detail. The 3D terrain map may or may not include height data such as an elevation model of the terrain, or terrain object data such as location and extent of buildings, forests, fields, lakes, rivers, trails, roads, etc. In projecting the shadows of the drones onto the 3D terrain map in an outdoor setting, step 305 may estimate the location of the sun (for example in elevation and azimuth angles) based on the current local time. Step 305 may also account for the current weather situation. For example, if the sun is blocked by clouds or has set, step 305 may switch to exclude shadows as a source of NFZ violation. In an indoor setting, the 3D terrain map may include information about the location of light sources.

It is also conceivable that step 305 adjusts the criterion for detecting a projected NFZ violation based on the 3D terrain map. For example, step 305 may exclude violation by shadow if the footage is deemed to be taken in a shadowy terrain, for example in a forest. Conversely, step 305 may include violation by shadow if the footage is deemed to be taken in open and/or bright terrain, for example on a field or slope covered with snow or ice. In another embodiment, the criterion applied by step 305 may be set before the operation of the drones by an operator with knowledge of the terrain and the weather situation.

As noted above with reference to step 302, the 3D terrain map may also be used for estimating the projected camera setting if the camera 14 is configured to auto-adjust its camera setting. For example, if the terrain is known to become shadowy (for example when entering a forest), the camera 14 may be expected to decrease the f-number and thus change the focal length.

Figure 6:
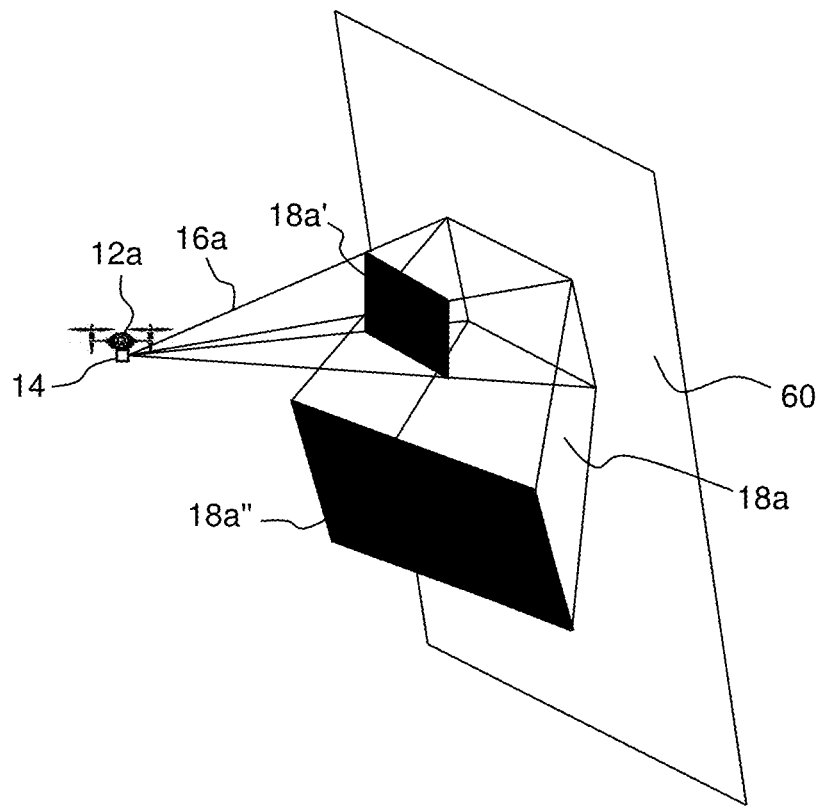
FIG. 6 is a perspective view of a viewing frustum of an onboard camera facing a reflective surface.

Additionally or alternatively, the method 300 may use the 3D terrain map to detect and account for reflective surfaces in the terrain, such as facades of skyscrapers, surfaces or lakes, etc. FIG. 6 illustrates a drone 12a with a field of view 16a facing a reflective surface 60. In the illustrated example, the viewing frustum 18a is deflected in the reflective surface 60 such that the surface 60 is optically located between the rear and far planes 18a', 18a'' of the viewing frustum 18a. It is understood that such a deflection of the viewing frustum 18a may also affect the corresponding no-fly zone.

Thus, in one embodiment, step 304 comprises accounting for deflection of the respective projected viewing frustum in one or more reflective surfaces defined by the 3D terrain map, when defining the projected time-space NFZ trajectories.

The control method 300 may be implemented with different partitioning of its functionality among included devices. Irrespective of partitioning, the implementation may be seen to result in a control system that performs any of the embodiments of the method 300 as described herein.

In one implementation, the method 300 is at least partly performed by an external control device in wireless communication with the group of drones. Such an implementation is exemplified in FIG. 4A, in which a ground- or cloud-based control device 40 receives drone data DDa, DDb, DDc from a local control device 20 on the respective drone 12a, 12b, 12c and transmits adjustment control data, ACD, to the local control device 20 of a selected drone 12c. An example of a control method 500A performed by the control device 40 is illustrated in FIG. 5A. Step 501 involves obtaining drone data DDa-DDc indicative of the projected flight paths and the time-space NFZ trajectories of the drones 12a-12c. In one example, the respective drone 12a-12c may be configured to determine its projected flight path (cf. step 301) and/or its projected camera setting (cf. step 302) and include corresponding data in DDa-DDc, allowing the external control device 40 to compute the projected time-space NFZ trajectories (cf. steps 303-304). In another example, the respective drone 12a-12c may be further configured to compute its projected viewing frustum (cf. step 303) and possibly its projected time-space NFZ trajectory (cf. step 304) and include corresponding data in DDa-DDc. Thus, DDa-DDc may include any combination of the projected flight path, the projected camera setting, the projected viewing frustum, and the projected time-space NFZ trajectory of the respective drone. Steps 502-504 correspond to steps 305-307 of the control method 300. Depending on the content of DDa-DDc, step 502 may further comprise one or more of steps 301-304. Step 505 involves generating and transmitting the ACD to cause the selected drone(s) to perform step 308.

In an alternative implementation, the method 300 is performed entirely by the drones in the group of drones, for example by the local control devices 20. An implementation example is shown in FIG. 4B, where drone 12a assumes the role of the external control device 40 in FIG. 4A. The drone 12a is effectively a master drone that controls the group of drones based on DDb, DDc from the other drones 12b, 12c. The master drone 12a may thus perform the control method 500A of FIG. 5A, where step 501 additionally comprises determining the projected flight path and the time-space NFZ trajectory of the master drone 12a itself (for example by steps 301-304). Depending on the drone(s) selected by step 504, step 505 may involve transmitting the ACD to one or more of the other drones 12b, 12c and/or performing step 308 on the master drone 12a itself.

In a further implementation, the control method 500A of FIG. 5A is performed by each drone 12a-12c in the group of drones. In such an implementation, the drone data DDa-DDc may be distributed among all drones 12a-12c in the group, and the respective drone 12a-12c may then perform steps 502-505. In one example, each drone broadcasts its drone data for receipt by the other drones in the group. The drones 12a-12c may share a criterion for determining the selected drone(s) in step 504, so that the respective drone 12a-12c is capable of determining if it is to be selected and, if so, adjust its camera setting and/or flight path accordingly (cf. step 505). For example, step 504 may be based on the above-mentioned priority values, which may be included in the drone data DDa-DDc.

A control method 500B in accordance with another embodiment is shown in FIG. 5B. The method 500B may be performed by each drone 12a-12c in the group of drones, for example by the respective local control device 20. In the context of FIG. 5B, the drone that performs the method 500B is denoted "first drone", and each other drone in the group is denoted "second drone". In the following, the method 500B will be exemplified with reference to FIG. 4B and with drone 12a as the first drone. In step 501A, the first drone 12a determines its projected flight path and its projected time-space NFZ trajectory, for example as described above with reference to steps 301-304. In step 501B, the first drone 12a transmits drone data DDa indicative of the projected flight path or the projected time-space NFZ trajectory, for receipt by the second drones 12b, 12c. Step 501B thereby enables each of the second drones 12b, 12c to perform the method 500B. In step 501C, the first drone 12a receives the drone data DDb, DDc of the second drones 12b, 12c, for example by wireless transmission from the respective second drone 12b, 12c. The drone data DDb, DDc is indicative of, and thus enables the first drone 12a to determine, the projected flight path or the projected time-space NFZ trajectory of the respective drone 12b, 12c. In step 502', the first drone 12a performs an analysis for detection of a projected NFZ violation. The analysis in step 502' may be implemented differently depending on the content of the drone data DDb, DDc. In a first implementation, the drone data DDb, DDc comprises the projected time-space NFZ trajectory of the respective second drone 12b, 12c, and step 502' involves the first drone 12a comparing its flight path to the projected time-space NFZ trajectories of the second drones 12b, 12c for detection of a projected violation. In a second implementation, the drone data DDb, DDc comprises the flight path of the respective second drone 12b, 12c, and step 502' involves the first drone 12a comparing its projected time-space NFZ trajectory with the flight paths of the second drones 12b, 12c for detection of a projected violation. In the illustrated embodiment, the first drone 12a is selected by default. Thus, when step 502' detects a projected NFZ violation, step 503 proceeds to the adjustment step 505. In the first implementation, step 505 causes the first drone 12a to adjust its flight path to prevent the projected NFZ violation. In the second implementation, step 505 causes the first drone 12a to adjust its flight path and/or camera setting to prevent the projected NFZ violation. It should be realized that by performing the method 500B in each of the drones 12a-12c, future NFZ violations between any pair of drones may be timely detected and prevented.

In variants of the method 508B, the drone data DDa-DDc may include both the project flight path and the projected time-space NFC trajectory of the respective drone 12a-12c, the method 508B may include a step 504 of actively selecting the drone(s) to be adjusted, and step 505 may involve generating and transmitting adjustment control data, ACD, to a selected drone.

The embodiments described herein are applicable for controlling drones that are operated in a group to capture images or footage for professional, cinematographic or amateur purposes, for example to improve the quality of the footage and/or facilitate planning. The embodiments are also applicable for controlling drones that are operated in a group for search and rescue (SAR), for example to search for and provision of aid to one or more individuals that are missing, in distress or in imminent danger. The embodiments facilitate planning of the SAR operation and increase the chances of locating the individual by improving the quality of the footage. The embodiments are also applicable for drones with vision-based guidance systems, by reducing the risk that a drone loses track of a waypoint or target as a result of drone-in-image interference.

In some deployments, there is a risk that the group of drones encounters a drone not belonging to the group, denoted "foreign drone" in the following. The control methods 300, 500A, 500B may be adapted to detect and account for such a foreign drone by image analysis. For example, the method 300/500A/500B may involve obtaining a time-sequence of images captured by the respective camera and processing the time-sequence of images for detection of the foreign drone, for example by searching for a drone-related object in the images. If a foreign drone is detected by one of the drones, the method 300/500A/500B may determine, based on the time-sequence of images, a projected flight path of the foreign drone and include the projected flight path of the foreign drone among the projected flight paths to be analyzed by step 305, 502, 502', respectively.

Figure 7:
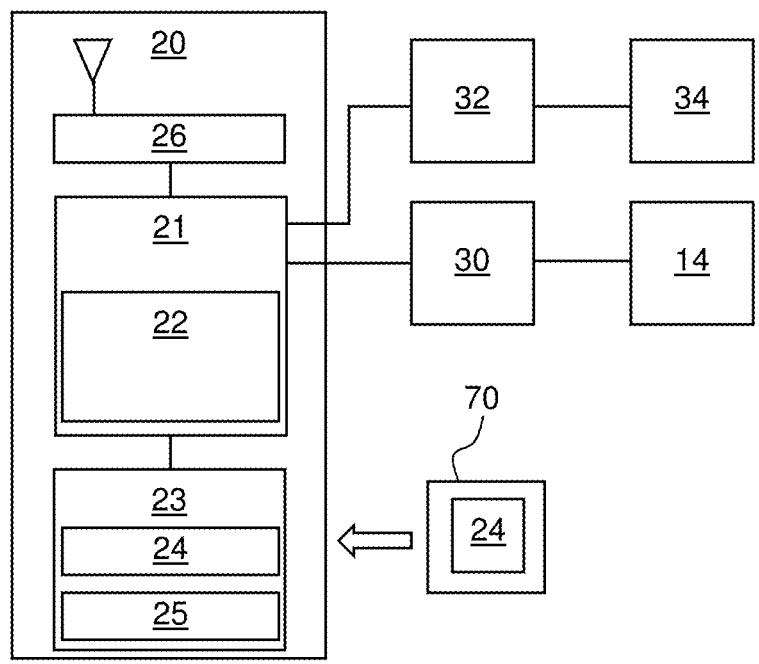
FIG. 7 is a block diagram of a control device in accordance with an embodiment.

FIG. 7 is a block diagram of an exemplifying structure of the local control device, LCD, 20 on the respective drone. Generally, the LCD 20 may be configured to perform any of the methods described herein, or part thereof, by a combination of software and hardware circuitry, or exclusively by specific hardware circuitry. In FIG. 7, the LCD 20 comprises a control circuit 21 responsible for the overall operation of the LCD 20. As shown, the control circuit 21 may include a processing device or processor 22, which may be or include a central processing unit (CPU), graphics processing unit (GPU), microcontroller, microprocessor, ASIC, FPGA, or any other specific or general processing device. The processor 22 may execute instructions 24 stored in a separate memory, such as memory 23, and/or in an internal memory (not shown) of the control circuit 21, in order to control the operation of the LCD 20. The instructions 24 when executed by the processor 22 may cause the LCD 20 to perform any of the methods described herein, or part thereof. For example, the control method 500A/500B may be implemented by the instructions 24. As indicated in FIG. 7, the memory 23 may also store data 25 for use by the processor 22, for example predefined priority value(s), 3D terrain map, a predefined flight plan, etc. The memory 23 may comprise one or more of a buffer, a flash memory, a hard drive, a removable media, a volatile memory, a non-volatile memory, a random access memory (RAM), or another suitable device. In an exemplary arrangement, the memory 23 includes a non-volatile memory for long term data storage and a volatile memory that functions as system memory for the control circuit 21. The memory 23 may exchange data with the control circuit 21 over a data bus. Accompanying control lines and an address bus between the memory 23 and the control circuit 21 also may be present. The memory 23 is considered a non-transitory computer readable medium. The LCD 20 may further include a communication device 26 for wireless communication, for example with one or more other LCDs 20 (cf. FIG. 4B) or an external control device (cf. 40 in FIG. 4A). The communication device 26 may comprise at least one radio transceiver, at least one antenna, tuners, impedance matching circuits, and any other components needed for wireless communication. In a variant, the communication device 26 is separate from the LCD 20.

It may be noted that some functions of the described methods may be implemented in hardware, which may be invoked by the executing instructions 24 to produce a specific type of output from a specific type of input. The instructions 24 may be supplied to the LCD 20 on a computer-readable medium 70, which may be a tangible (non-transitory) product (for example magnetic medium, optical disk, read-only memory, flash memory, etc.) or a propagating signal.

In the example of FIG. 7, the LCD 20 is connected to a camera controller 30, which in turn is arranged to control the operation of the camera 14 in a manner well-known to the person skilled in the art. Further, the LCD 20 may be connected to (or part of) a flight controller 32, which is turn is arranged to control the operation of one or more motors 34 for propulsion of the drone. Reverting to FIGS. 4A-4B, the ACD may cause the control circuit 21 of the LDC 20 to provide commands to the camera controller 30 to adjust the camera setting and/or to the flight controller 32 to adjust the flight path in accordance with step 308/505.

Figure 4A:
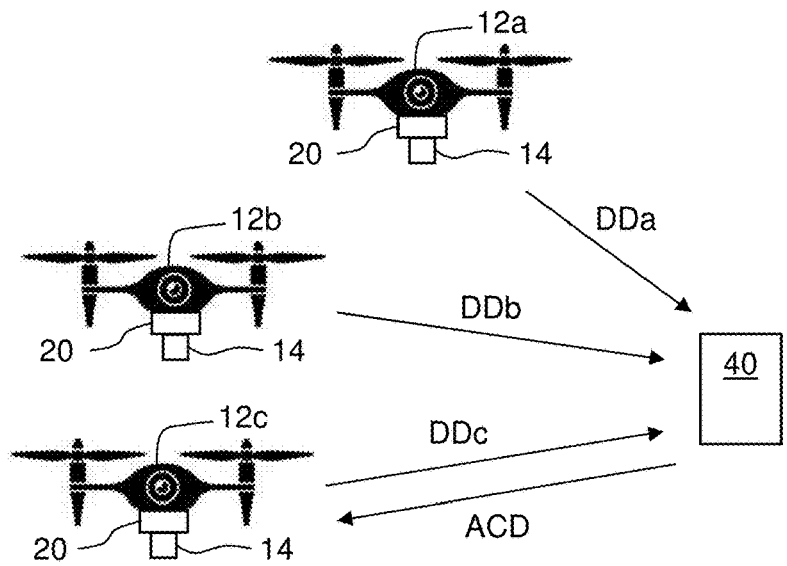
FIGS. 4A-4B show examples of data communication within drone systems.
Figure 4B:
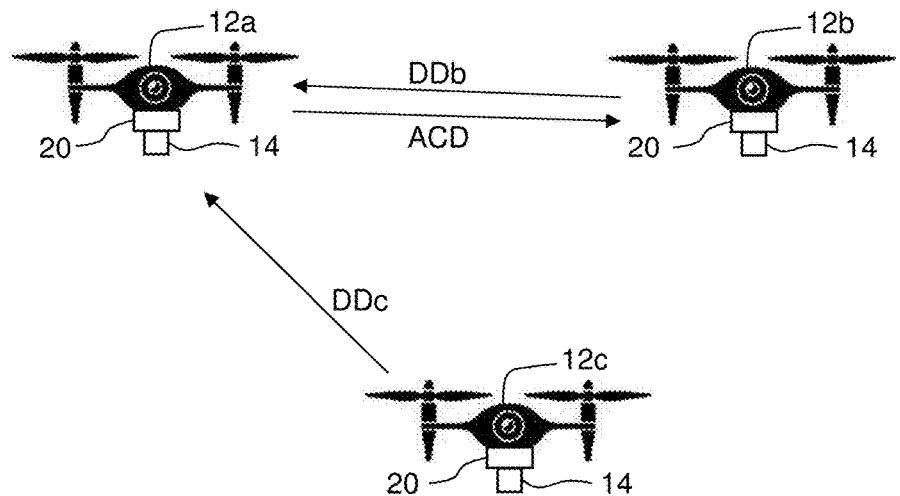
Figures 5A, 5B:
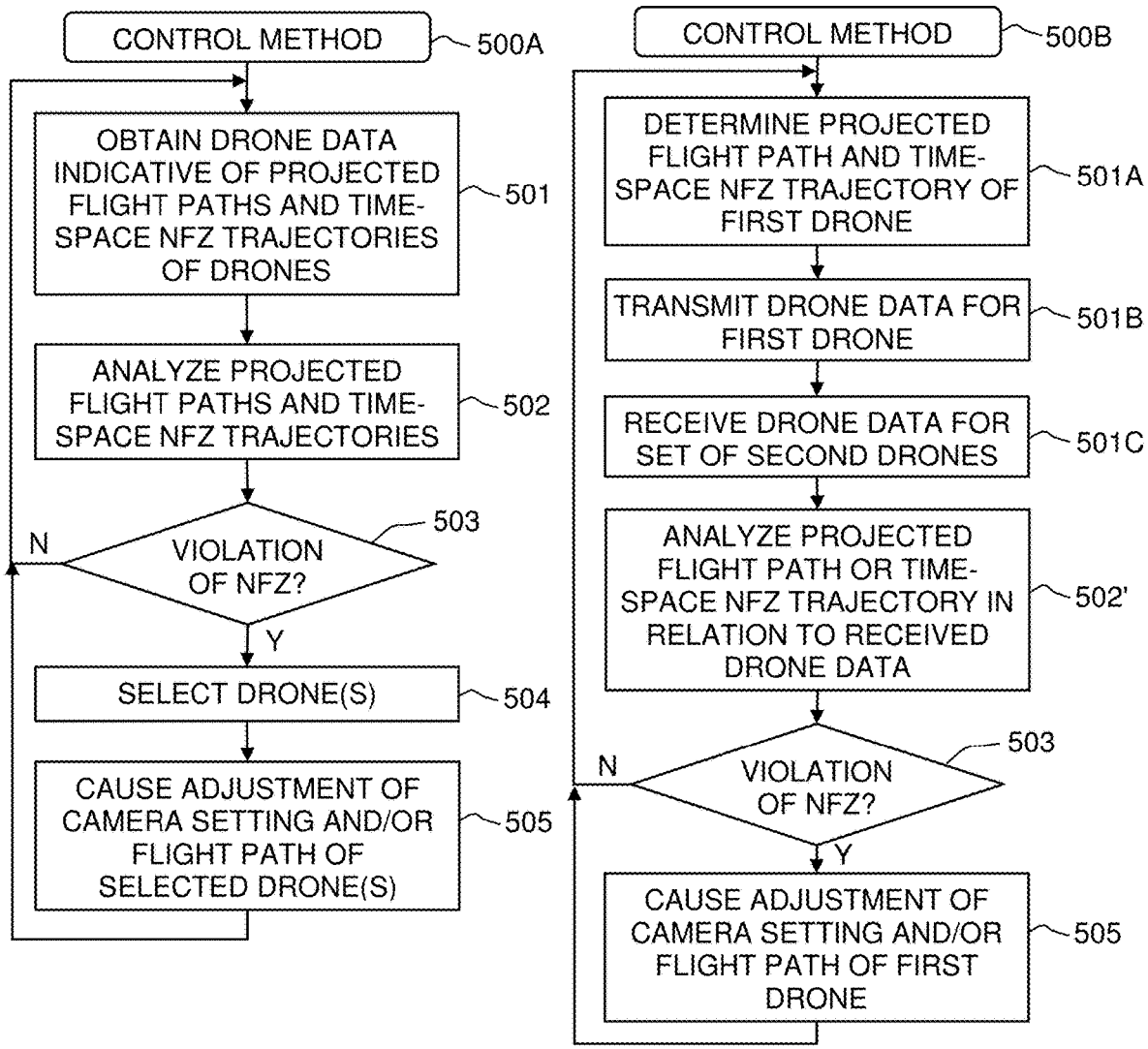
FIGS. 5A and 5B are flow charts of drone control methods in accordance with embodiments.

FIG. 7 may also be seen to exemplify the structure of the external control device 40 in FIG. 4A, which however lacks camera controller 30, camera 14, flight controller 32 and propulsion motor(s) 34.

While the subject of the present disclosure has been described in connection with what is presently considered to be the most practical embodiments, it is to be understood that the subject of the present disclosure is not to be limited to the disclosed embodiments, but on the contrary, is intended to cover various modifications and equivalent arrangements included within the spirit and the scope of the appended claims.

Further, while operations are depicted in the drawings in a particular order, this should not be understood as requiring that such operations be performed in the particular order shown or in sequential order, or that all illustrated operations be performed, to achieve desirable results. In certain circumstances, parallel processing may be advantageous.

In the following, items are recited to summarize some aspects and embodiments as disclosed in the foregoing.

Item 1: A method of controlling drones (12a, 12b) in a group of drones, wherein the drones (12a, 12b) comprise respective camera systems (14) for image capture, said method comprising:

obtaining (301) projected flight paths (Ta', Tb') of the drones (12a, 12b);

obtaining (302) a projected camera setting of the respective camera systems (14);

computing (303), as a function of the projected camera setting, a projected viewing frustum (18a, 18b) of the respective camera systems (14);

defining (304), for the drones (12a, 12b), projected time-space trajectories of no-fly zones based on the projected viewing frustum (18a, 18b) of the respective camera systems (14);

analyzing (305) the projected flight paths (Ta', Tb') of the drones (12a, 12b) in relation to the projected time-space trajectories for detection of a violation of one or more of the no-fly zones; and setting (308), for at least one selected drone among the drones (12a, 12b), an operative flight path (Ta, Tb) and/or an operative camera setting to prevent said violation.

Item 2: The method of item 1, further comprising applying a priority value associated with a respective drone (12a, 12b) in the group of drones to determine the at least one selected drone.

Item 3: The method of item 2, further comprising determining the priority value as a function of at least one of a current position of the respective drone (12a, 12b) and a current camera setting of the respective camera systems (14).

Item 4: The method of item 2 or 3, wherein the priority value is determined as a function of a quality measure of images captured by the respective camera systems (14).

Item 5: The method of any preceding item, wherein the violation comprises at least one of the drones (12a, 12b) being at least partly located within said one or more no-fly zones.

Item 6: The method of any preceding item, further comprising: projecting shadows of the drones onto a three-dimensional terrain representation, wherein the violation comprises a shadow (19b) of at least one of the drones (12a, 12b) being at least partly located within said one or more no-fly zones.

Item 7: The method of item 6, further comprising: computing, as a function of the projected flight paths (Ta', Tb') of the drones (12a, 12b), projected flight paths of the shadows of the drones (12a, 12b), and analyzing the projected flight paths of the shadows of the drones (12a, 12b) in relation to the projected time-space trajectories for detection of said violation.

Item 8: The method of item 6 or 7, further comprising: adjusting a criterion for detection of said violation based on the three-dimensional terrain representation.

Item 9: The method of any one of items 6-8, wherein three-dimensional terrain representation is indicative of one or more reflective surfaces (60), and wherein said defining (304) the projected time-space trajectories of the no-fly zones comprises accounting for deflection of the projected viewing frustum (18a, 18b) of the respective camera systems (14) in the one or more reflective surfaces (60).

Item 10: The method of any preceding item, further comprising: obtaining a time-sequence of images captured by the respective camera systems (14); processing the time-sequence of images for detection of a drone-related object; determining, based on the time-sequence of images, a projected flight path of the drone-related object; and including in said analyzing (305) the projected flight path of the drone-related object among the projected flight paths (Ta', Tb') of the drones (12a, 12b).

Item 11: A computer-readable medium comprising computer instructions (24) which, when executed by a processor (21), cause the processor (21) to perform the method of any one of items 1-10.

Item 12: A control system for controlling drones (12a, 12b, 12c) in a group of drones, wherein the drones (12a, 12b, 12c) comprise respective camera systems (14) for image capture, said control system being configured to:

obtain drone data (DDa, DDb, DDc) indicative of projected flight paths of the drones (12a, 12b, 12c) and corresponding projected time-space trajectories of no-fly zones for the drones (12a, 12b, 12c), wherein the no-fly zones correspond to a projected viewing frustum of the respective camera systems (14);

analyze the projected flight paths of the drones (12a, 12b, 12c) in relation to the projected time-space trajectories of the no-fly zones of the drones (12a, 12b, 12c) for detection of a violation of one or more of the no-fly zones; and cause an adjustment of a flight controller (32) on at least one selected drone among the drones (12a, 12b, 12c) and/or the camera system (14) on the at least one selected drone to prevent said violation.

Item 13: The control system of item 12, which is located on a first drone (12a) in the group of drones and configured to communicate wirelessly with a respective local control device (20) on a set of second drones (12b, 12c) in the group of drones.

Item 14: The control system of item 13, which is configured to obtain the drone data (DDb, DDc) for the set of second drones (12b, 12c) by wireless communication with the respective local control device (20), and to obtain the drone data (DDa) for the first drone (12a) by:

obtaining a projected flight path (Ta') of the first drone (12a);

obtaining a projected camera setting of the camera system (14) of the first drone (12a);

computing, as a function of the projected camera setting, the projected viewing frustum of the camera system (14) of the first drone (12a); and defining, for the first drone (12a), a projected time-space trajectory of a no-fly zone based on the projected viewing frustum.

Item 15: The control system of item 14, wherein the drone data (DDb, DDc) for the set of second drones (12b, 12c) comprises at set of projected flight paths of the set of second drones (12b, 12c), and one of: a set of projected time-space trajectories of the no-fly zones for the set of second drones (12b, 12c), and a projected camera setting of the respective camera system (14) of the set of second drones (12b, 12c).

Item 16: The control system of item 12, which is separate from the drones (12a, 12b, 12c) and configured to communicate wirelessly with local control devices (20) on the drones (12a, 12b, 12c).

Item 17: A control device for installation on a first drone (12a) which is configured for wireless communication with a set of second drones (12b, 12c), wherein the first drone (12a) comprises a first camera system (14), and wherein each second drone (12b, 12c) in the set of second drones (12b, 12c) comprises a respective second camera system (14), said control device being configured to:

determine, for the first drone (12a), at least one of a projected flight path and a projected time-space trajectory of a first no-fly zone, wherein the first no-fly zone corresponds to a projected viewing frustum of the first camera system (14);

receive, by said wireless communication, drone data (DDb, DDc) indicative of a set of projected flight paths of the set of second drones (12b, 12c) and/or a set of projected time-space trajectories of second no-fly zones for the set of second drones (12b, 12c), wherein the second no-fly zones correspond to a projected viewing frustum of the respective second camera system (14);

analyze said at least one of a projected flight path and a projected time-space trajectory of a first no-fly zone in relation to said drone data (DDb, DDc) for detection of a violation of one or more of the first no-fly zone and the second no-fly zones; and cause an adjustment of an operative flight path and/or an operative camera setting of a selected drone among the first drone (12a) and the set of second drones (12b, 12c), to prevent said violation.

Item 18: The control device of item 17, which is configured to determine the projected time-space trajectory of the first no-fly zone by: obtaining a projected camera setting of the first camera system (14); computing, as a function of the projected camera setting, the projected viewing frustum of the first camera system (14); and defining the projected time-space trajectory of the first no-fly zone based on the projected viewing frustum of the first camera system (14).

Item 19: The control device of item 17 or 18, which is configured to adjust the operative flight path (Ta) and/or the operative camera setting of the first drone (12a) to prevent said violation.

Item 20: The control device of any one of items 17-19, which is further configured to transmit, by the wireless communication and for receipt by the set of second drones (12b, 12c), drone data (DDa) indicative of the projected flight path of the first drone (12a) and/or the projected time-space trajectory of the first no-fly zone.

Item 21: A drone comprising a first camera system (14) and the control device in accordance with any one of items 17-20.

The invention claimed is:

1. A method of controlling drones in a group of drones, wherein the drones comprise respective camera systems for image capture, said method comprising:

obtaining projected flight paths of the drones;

obtaining a projected camera setting of the respective camera systems;

computing, as a function of the projected camera setting, a projected viewing frustum of the respective camera systems;

defining, for the drones, projected time-space trajectories of no-fly zones based on the projected viewing frustum of the respective camera systems;

analyzing the projected flight paths of the drones in relation to the projected time-space trajectories for detection of a violation of one or more of the no-fly zones;

setting, for at least one selected drone among the group of drones, an operative flight path and/or an operative camera setting to prevent said violation, and applying a priority value associated with a respective drone in the group of drones to determine the at least one selected drone, wherein the applying the priority value comprises utilizing a predefined prioritization logic to determine the at least one selected drone as a function of the priority value.

2. The method of claim 1, further comprising:

determining the priority value as a function of at least one of a current position of the respective drone and a current camera setting of the respective camera systems.

3. The method of claim 1, wherein the priority value is determined as a function of a quality measure of images captured by the respective camera systems.

4. The method of claim 1, wherein the violation comprises at least one of the drones being at least partly located within said one or more of the no-fly zones.

5. The method of claim 1, further comprising:

projecting shadows of the drones onto a three-dimensional terrain representation, wherein the violation comprises a shadow of at least one of the drones being at least partly located within said one or more of the no-fly zones.

6. The method of claim 5, further comprising:

computing, as a function of the projected flight paths of the drones, projected flight paths of the shadows of the drones, and analyzing the projected flight paths of the shadows of the drones in relation to the projected time-space trajectories for detection of said violation.

7. The method of claim 5, further comprising:
adjusting a criterion for detection of said violation based on the three-dimensional terrain representation.

8. The method of claim 5,
wherein the three-dimensional terrain representation is indicative of one or more reflective surfaces, and
wherein said defining the projected time-space trajectories of the no-fly zones comprises accounting for deflection of the projected viewing frustum of the respective camera systems in the one or more reflective surfaces.

9. The method of claim 1, further comprising:
obtaining a time-sequence of images captured by the respective camera systems;
processing the time-sequence of images for detection of a drone-related object;
determining, based on the time-sequence of images, a projected flight path of the drone-related object; and
including in said analyzing the projected flight path of the drone-related object among the projected flight paths of the drones.

10. A control system for controlling drones in a group of drones, wherein the drones comprise respective camera systems for image capture, said control system being configured to perform operations comprising:
obtaining drone data indicative of projected flight paths of the drones and corresponding projected time-space trajectories of no-fly zones for the drones, wherein the no-fly zones correspond to a projected viewing frustum of the respective camera systems;
analyzing the projected flight paths of the drones in relation to the projected time-space trajectories of the no-fly zones of the drones for detection of a violation of one or more of the no-fly zones; and
causing an adjustment of a flight controller on at least one selected drone among the drones and/or the camera system on the at least one selected drone to prevent said violation, and
applying a priority value associated with a respective drone in the group of drones to determine the at least one selected drone,
wherein the applying the priority value comprises utilizing a predefined prioritization logic to determine the at least one selected drone as a function of the priority value.

11. The control system of claim 10, wherein the control system is located on a first drone in the group of drones and configured to communicate wirelessly with a respective local control device on a set of second drones in the group of drones.

12. The control system of claim 11, wherein the control system is configured to obtain the drone data for the set of second drones by wireless communication with the respective local control device, and to obtain the drone data for the first drone by performing operations comprising:
obtaining a projected flight path of the first drone;
obtaining a projected camera setting of the camera system of the first drone;
computing, as a function of the projected camera setting, the projected viewing frustum of the camera system of the first drone; and
defining, for the first drone, a projected time-space trajectory of a no-fly zone based on the projected viewing frustum.

13. The control system of claim 12, wherein the drone data for the set of second drones comprises at set of projected flight paths of the set of second drones, and one of: a set of projected time-space trajectories of the no-fly zones for the set of second drones, or a projected camera setting of the respective camera system of the set of second drones.

14. The control system of claim 10, wherein the control system is separate from the drones and configured to communicate wirelessly with local control devices on the drones.

15. A control device for installation on a first drone which is configured for wireless communication with a set of second drones, wherein the first drone comprises a first camera system, and wherein each second drone in the set of second drones comprises a respective second camera system, wherein said control device is configured to perform operations comprising:
determining, for the first drone, at least one of a projected flight path or a projected time-space trajectory of a first no-fly zone, wherein the first no-fly zone corresponds to a projected viewing frustum of the first camera system;
receiving, by said wireless communication, drone data indicative of a set of projected flight paths of the set of second drones and/or a set of projected time-space trajectories of second no-fly zones for the set of second drones, wherein the second no-fly zones correspond to a projected viewing frustum of the respective second camera system;
analyzing said at least one of a projected flight path or a projected time-space trajectory of a first no-fly zone in relation to said drone data for detection of a violation of one or more of the first no-fly zone and the second no-fly zones;
causing an adjustment of an operative flight path and/or an operative camera setting of a selected drone among the first drone and the set of second drones, to prevent said violation; and
applying a priority value associated with a respective drone among the first drone and the set of second drones to determine the selected drone,
wherein the applying the priority value comprises utilizing a predefined prioritization logic to determine the selected drone as a function of the priority value.

16. The control device of claim 15, wherein the control device is configured to determine the projected time-space trajectory of the first no-fly zone by performing operations comprising:
obtaining a projected camera setting of the first camera system;
computing, as a function of the projected camera setting, the projected viewing frustum of the first camera system; and
defining the projected time-space trajectory of the first no-fly zone based on the projected viewing frustum of the first camera system.

17. The control device of claim 15, wherein the control device is configured to adjust the operative flight path and/or the operative camera setting of the first drone to prevent said violation.

18. The control device of claim 15, wherein the control device is further configured to transmit, by the wireless communication and for receipt by the set of second drones, drone data indicative of the projected flight path of the first drone and/or the projected time-space trajectory of the first no-fly zone.

19. A drone comprising a first camera system and the control device in accordance with claim 15.

* * * * *